April 15, 1958     N. CODA ET AL     2,830,698

CONDENSER

Filed April 25, 1955            2 Sheets-Sheet 1

Nello Coda INVENTORS
Kenneth I. Challstrom
BY
Ralph Hammar
Attorney

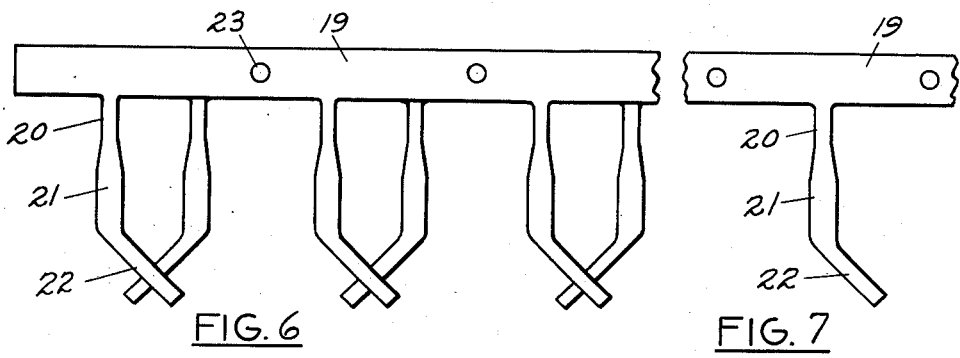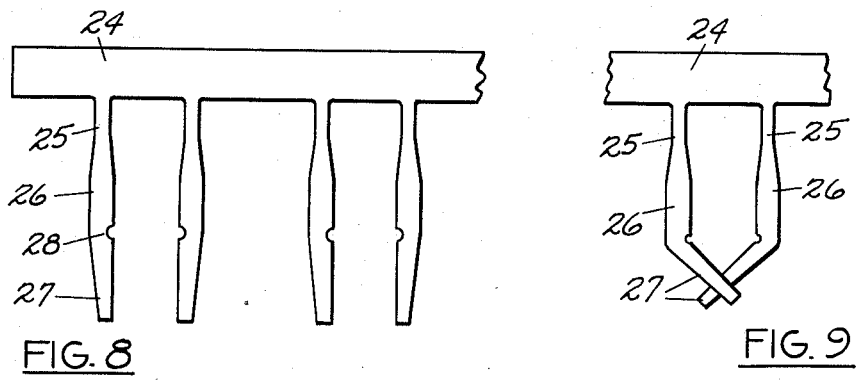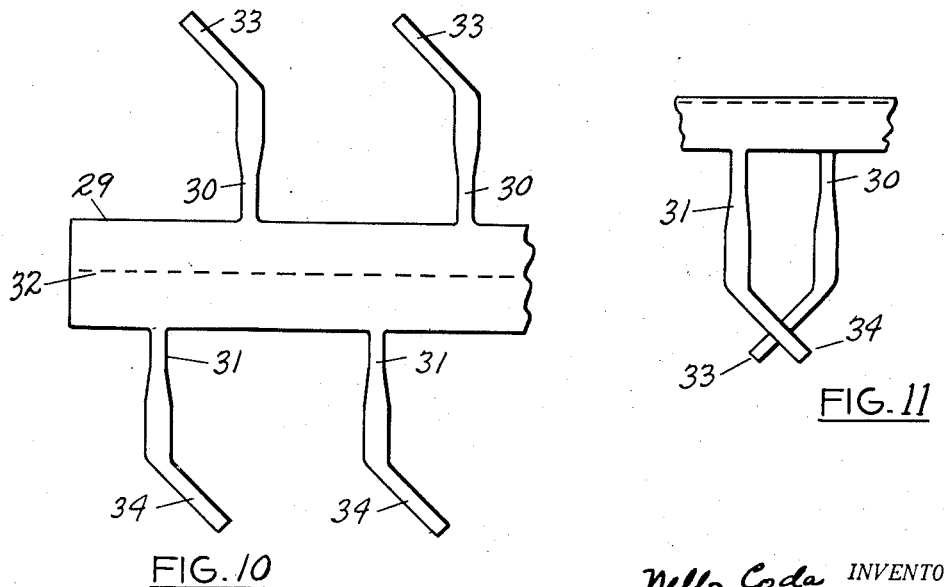

United States Patent Office 2,830,698
Patented Apr. 15, 1958

2,830,698

CONDENSER

Nello Coda, Erie, and Kenneth Challstrom, North East, Pa., assignors to Erie Resistor Corporation, Erie, Pa., a corporation of Pennsylvania Application April 25, 1955, Serial No. 503,724

4 Claims. (Cl. 206—56)

This invention is intended to simplify the manufacture of disc condensers having spaced sheet metal terminals. In a preferred form, the terminals are stamped in pairs out of a strip of sheet metal, one end of each pair of terminals being integral with the strip and the other ends of each pair extending crosswise of each other and soldered respectively to opposite electrodes of a disc condenser. The strip serves as a carrier for the condensers during manufacture and the condensers are cut off prior to use.

Figure 1:
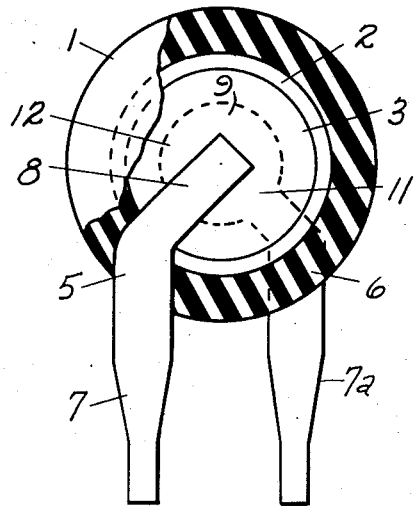
Figure 2:
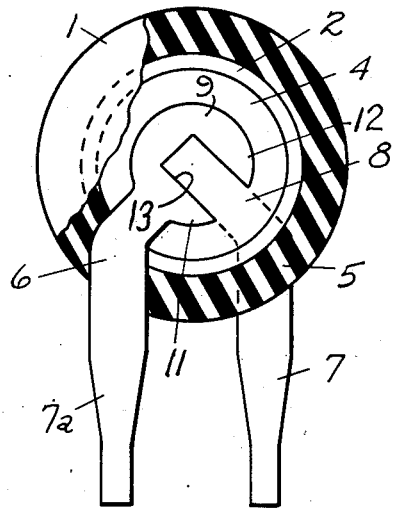
Figure 3:
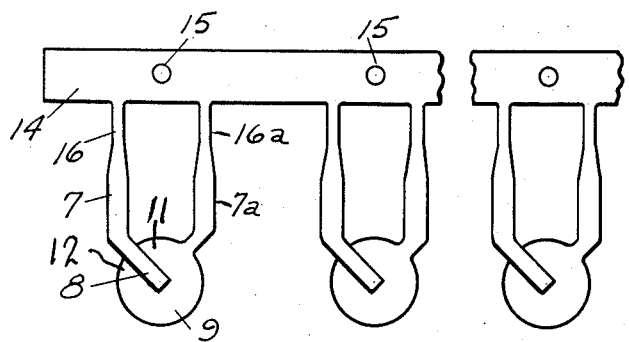
Figure 5:
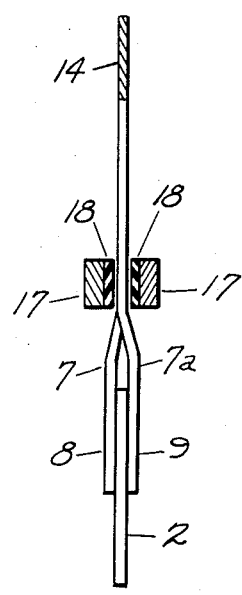
Figure 4:
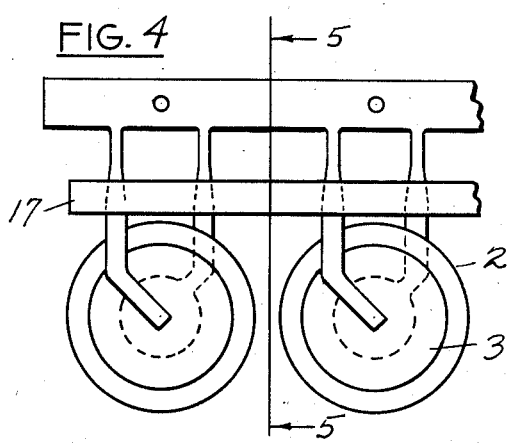

In the drawing, Fig. 1 is a view of one side of a disc condenser; Fig. 2 is a view of the opposite side; Fig. 3 shows a strip of terminals; Fig. 4 illustrates the use of the strip in the manufacture of condensers; Fig. 5 is a section on line 5—5 of Fig. 4; Fig. 6 shows a modification using two terminal strips back to back; Fig. 7 shows one of the terminal strips used in Fig 6; Fig. 8 shows another form of terminal strip in a preliminary stage; Fig. 9 shows the Fig. 8 strip with the pairs of terminals formed to receive condensers; Fig. 10 is another form of terminal strip with the terminals of each pair projecting from opposite edges and Fig. 11 shows the Fig. 10 strip folded on its centerline and bringing the terminals of each pair into side by side relation.

In Figs. 1 and 2 part of the insulating coating 1 is broken away to expose a disc condenser dielectric 2 having an electrode 3 on one side and an electrode 4 on the opposite side. The dielectric is usually ceramic and the electrodes are metallized on the ceramic to take full advantage of the high dielectric constants available in ceramics. Flat sheet metal terminals 5 and 6 are soldered respectively to the electrodes 3 and 4. The outer ends 7 and 7a of the terminals are accurately spaced parallel to each other and are tapered so as to be readily received in slots in electrical conductors to which the terminals are to be connected.

The inner ends 8 and 9 of the terminals which are soldered to the electrodes 3 and 4 extend cross-wise of each other in overlapping relation at the center of the condenser. The end 8 of the terminal 5 is of straight rectangular shape. The inner end 9 of the terminal 6 is C shaped with sides 11 and 12 embracing the end 8. From another aspect, the terminal end 9 is enlarged to cover an area substantially greater than the terminal end 8 and the terminal end 8 registers with a notch or slot 13 extending diagonally part way across the terminal end 9.

In manufacture, the terminals are punched in pairs out of a strip of sheet metal such as spring brass and at the end of the punching operation there is a continuous backing strip 14 having index holes 15 and a plurality of pairs of terminals connected to the backing strip 14 by connection portions 16, 16a. As shown in Fig. 4, a condenser dielectric may be readily inserted between the ends 8 and 9 of the terminals and the inherent resilience of the terminals will serve to grip the condenser between the terminal ends 8 and 9. The gripping action may be increased by clamping bars 17 on opposite sides of the terminals 7 and 7a and having rubber faces 18 holding the terminals 7 and 7a in a common plane close to the condenser dielectric. This provides increased gripping action by cutting down the deflecting span of the terminals. The backing strip 14 is used during manufacture for handling the condensers so that all of the condensers in the strip may be processed as a unit. After loading the condenser dielectric between the terminal ends 8 and 9, the strip of condensers is first dipped in solder to solder the terminals to the condenser electrodes and is then dipped in insulating material to apply the outer insulating case 1 and finally the connection portions 16 and 16a are cut off leaving only the projecting tapered terminals 7 and 7a. All of these manufacturing operations and any others necessary can readily be performed simultaneously on the entire group of condensers mounted in the strip. It is also possible to ship the strip of condensers to the customer and to have the final cutting operation separating the terminals 7 and 7a from the connecting portions 16 and 16a performed prior to use of the condensers.

In Figs. 6 and 7 is shown another construction for providing condensers with flat sheet metal leads. In this construction there are two strips 19 of sheet brass each having spaced connecting portions 20 extending from one edge of the strip and at the free ends having tapered terminal portions 21 which are to project outside the finished condenser and diagonally extending terminal portions 22 which are to contact one of the condenser electrodes. Prior to the use, one of the strips 19 is turned end for end and then fastened back to back against the other strip. When this is done, the terminal portions 21 are spaced apart as is desired in the finished condenser and the terminal portions 22 extend cross-wise of each other in overlapping relation so as to be in a position to receive a condenser dielectric there between. The condenser dielectric may be gripped entirely by the inherent resilience of the portions 20 and 21 or the gripping action may be supplemented by a clamp such as illustrated in Fig. 5. Index holes 23 serve to line up the strips so as to secure the proper spacing of the terminals.

In Figs 8 and 9 is shown another arrangement for providing sheet metal condenser terminals. In this construction, there is a strip 24 from one edge of which extend pairs of terminals there being portions 25 connecting the terminals to the edge of the strip 24, portions 26 which are tapered and which project outside the finished condenser and portions 27 which are to contact the condenser electrodes in the same manner as in the previously described constructions. When the strip is first punched as shown in Fig. 8, there are notches 28 at the inner ends of the terminal portions 26. The notches make it easy for the free ends 27 to be bent to extend cross-wise of each other as shown in Fig. 9 so as to grip a condenser electrode there between.

Another construction for providing sheet metal terminals is shown in Fig. 10 where a strip 29 of sheet brass has a plurality of terminals 30 and 31 projecting from opposite edges. When this strip is folded along its center line 32, the ends 33 and 34 of the terminals 30 and 31 are brought into overlapping cross-wise relation so as to be in a position to grip a condenser dielectric there between.

All of the terminal constructions are adapted to the handling of a large number of condensers as a unit throughout the manufacturing operations.

What is claimed as new is:

1. In a condenser, a dielectric disc having a pair of electrodes opposite each other and respectively on opposite faces of the disc, a sheet metal terminal having a portion of substantial area lying against one of the electrodes, said portion having a notch thereon extending inward from one edge, and another sheet metal terminal lying against the other electrode and registering with said notch.

2. In a condenser, a dielectric disc having a pair of electrodes opposite each other and respectively on opposite faces of the disc, a sheet metal strip, a pair of spaced lead portions integral with and projecting laterally from one edge of the strip, a terminal portion at the end of each lead portion, one terminal portion lying against one electrode and the other terminal portion lying against the other electrode, and said one terminal portion having a notch therein registering with said other terminal portion.

3. In a condenser, a dielectric disc having a pair of electrodes opposite each other and respectively on opposite faces of the disc, a pair of spaced sheet metal leads, sheet metal backing strip means joined to one end of each of the leads and supporting said one end of each of the leads generally in a common plane parallel to the faces of the disc, a terminal portion at the other end of each of the leads, one terminal portion lying against one electrode and the other terminal portion lying against the other electrode, and said one terminal portion having a notch therein registering with said other terminal portion.

4. A strip of condensers comprising sheet metal backing strip means, a plurality of pairs of spaced sheet metal leads joined to one edge of the backing strip means and held thereby generally in a common plane, terminal portions at the ends of the leads remote from the backing strip means, a disc condenser in said common plane and gripped between each pair of terminal portions, each disc condenser having a disc dielectric and a pair of electrodes opposite each other and respectively on opposite faces of the dielectric, the electrodes being in contact with the terminal portions, and one terminal portion of each pair having a notch therein registering with said other terminal portion of each pair.

References Cited in the file of this patent
UNITED STATES PATENTS

| | | |
|---|---|---|
| 309,414 | Smith | Dec. 16, 1884 |
| 1,774,538 | Aegerter | Sept. 2, 1930 |
| 1,926,842 | Dubilier | Sept. 12, 1933 |
| 1,972,411 | Swartz et al. | Sept. 4, 1934 |
| 2,321,071 | Ehrhardt et al. | June 8, 1943 |
| 2,606,955 | Herrick | Aug. 12, 1952 |
| 2,680,497 | Miller | June 8, 1954 |
| 2,757,792 | Shioleno | Aug. 7, 1956 |

FOREIGN PATENTS

| | | |
|---|---|---|
| 338,513 | Great Britain | Nov. 17, 1930 |
| 666,467 | Great Britain | Feb. 13, 1952 |